United States Patent [19]

Boutteville et al.

[11] 4,373,385

[45] Feb. 15, 1983

[54] FLUID PRESSURE DETECTION

[75] Inventors: Raymond Boutteville, Bois D'Arcy; Thierry Febvret, Versailles, both of France

[73] Assignee: Intertechnique, Plaisir, France

[21] Appl. No.: 236,555

[22] Filed: Feb. 20, 1981

[30] Foreign Application Priority Data

Feb. 27, 1980 [FR] France .................. 80 04381

[51] Int. Cl.³ .................. B60C 23/04; G01L 9/10
[52] U.S. Cl. .................. 73/146.5; 73/728; 340/58; 336/30
[58] Field of Search .................. 73/146.5, 146.4, 728; 340/58; 336/30

[56] References Cited

U.S. PATENT DOCUMENTS

| 2,056,064 | 9/1936 | Fenton | 340/58 |
| 2,822,530 | 2/1958 | Roten | 340/58 |
| 3,730,146 | 5/1973 | Mouids et al. | 73/728 |
| 4,161,886 | 7/1979 | Eshelman | 73/728 |

*Primary Examiner*—Donald O. Woodiel
*Attorney, Agent, or Firm*—Finnegan, Henderson, Farabow, Garrett & Dunner

[57] ABSTRACT

A pressure sensor for measuring the pressure in an aircraft wheel tire comprises a stationary housing and a shaft connected to the wheel. A unit slidably connected to the shaft has a surface cooperating with a pair of bellows coaxial to the shaft to define a pressure chamber. A passage in the shaft communicates the pressure chamber and the tire.

7 Claims, 2 Drawing Figures

FLUID PRESSURE DETECTION

BACKGROUND AND SUMMARY OF THE INVENTION

The present invention relates to detection of the fluid pressure in a rotary unit and more particularly to a pressure detector or sensor adapted to deliver an electrical voltage which is a function of the pressure in the unit.

The invention is particularly suitable for use in measuring the pressure in the tire of an aircraft wheel. It is known that a burst or deflated tire may cause an accident on taking off or landing. While a burst tire may be located by visual inspection before the aircraft leaves its parking station, the presence of one or more deflated or under-inflated tires may pass unobserved by the ground personnel. It is consequently desirable to provide an indication on the inflating pressure.

A first consideration of the problem suggests that it may be solved by placing a sensor on the rotary portion of the wheel assembly and transmitting the electrical output signal through a ring and brush system. That solution involves a sliding contact and has drawbacks which are particularly acute in an aircraft wheel due to the temperature variations and the presence of pollutants which requires the use of a sealed system.

It is an object of the invention to provide a detector which is small in size, does not interfere with other devices which may possibly have to be driven by the rotary unit and may easily be rendered fluid-tight.

According to the invention, a pressure detector comprises a non-rotatable housing in which a central shaft for coupling with the rotatable unit is mounted for free rotation while retained against axial movement. The detector further comprises an assembly slidably received on the shaft, connected to the shaft by deformable wall means which define, with surfaces of said assembly, a pressure chamber connectable to the inside of the unit through passage means in the shaft. Said surfaces of the assembly are so constructed that the chamber pressure exerts on the assembly an effective axially directed force which opposes that of a return spring placed between the shaft and the assembly. The assembly may comprise a body of ferromagnetic material variably coupling energizing and receiving windings of a differential transformer carried by the housing. The shape of the ferromagnetic body is such that its axial movement causes variation of the reluctance of the differential transformer and causes a signal to appear at the output of the receiving winding, typically straddled by two energizing windings in the axial direction.

In a particular embodiment, the shaft is provided with radial flanges of different diameters, connected by bellows constituting deformable walls to opposed end surfaces of a disk secured to the movable assembly so as to define surfaces of different effective pressure action areas on the two surfaces of the disk.

If the detector is mounted on an aircraft wheel, the housing will typically be secured to the fixed axle and the shaft will mechanically couple the rotary portion of the wheel and the tachometric generator which is generally necessary, particularly to control an anti-skid braking system.

The invention will be better understood from the following description of particular embodiments, given by way of examples only.

SHORT DESCRIPTION OF THE DRAWINGS

FIGS. 1 and 2 are views of two embodiments of a detector, in cross section along a plane passing through the detector axis.

DETAILED DESCRIPTION OF PREFERRED EMBODIMENTS

Figure 1:
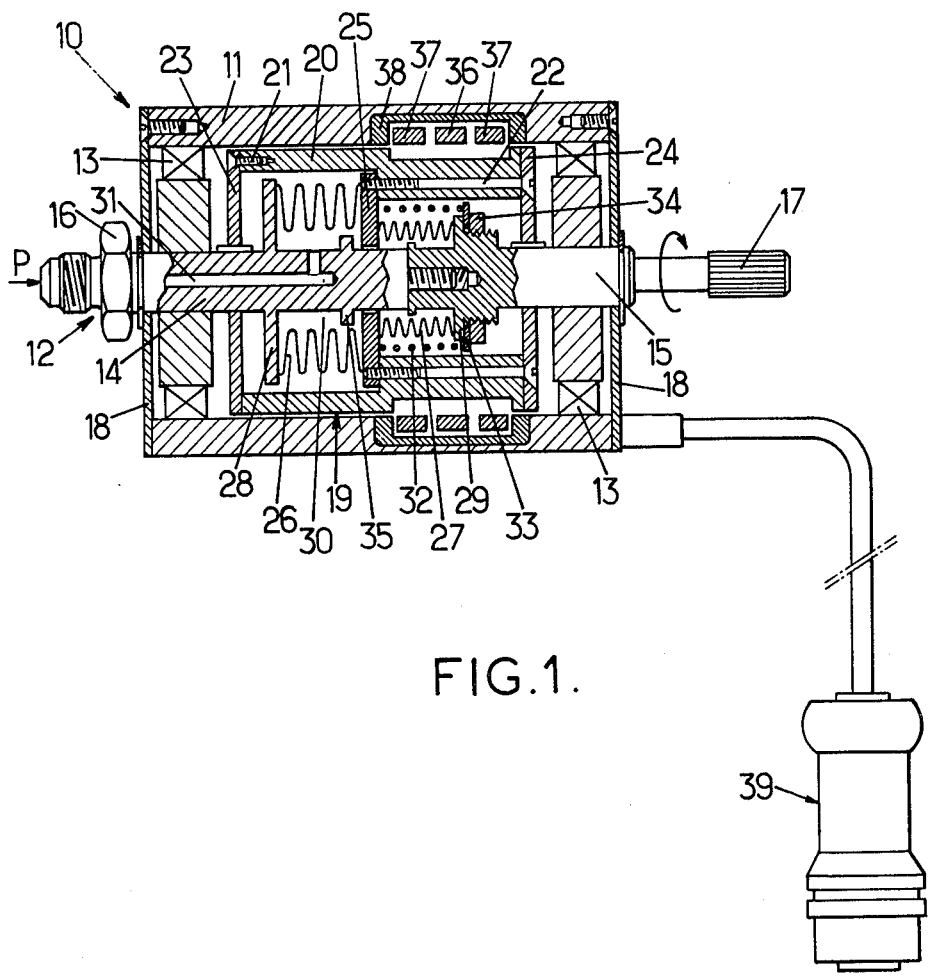

Referring to the drawings, the detector 10 comprises a housing 11 of non-magnetic material, for example a light alloy, provided with means for securing it on a fixed wheel axle. Such means may be conventional and are not illustrated. The housing 11 carries fluid-tight bearings 13 supporting a rotary shaft 12 and retaining it against axial movement.

In the embodiment of FIG. 1, the shaft has two sections 14 and 15 threadedly connected to each other. One of the sections is formed with a screw thread and carries a nut 16 for connection with the rotary portion of the wheel. The other section 15 is provided with a grooved projection 17 for connection with another member, for instance a tachometric generator. The two sections axially project out of the housing through end sealing walls 18 of the housing 11. It is seen that the shaft constitutes a motion-transmitting member as well as the input member for the detector 10.

An assembly or unit 19 comprising a body of ferromagnetic material 20 is slidably mounted on shaft 12. In the embodiment of FIG. 1, the body is a ring 20 of soft iron. Ring 20 is secured by screws 21 and 22 to plates 23 and 24 slidably non rotatably connected to shaft 12. The screws 22 also retain a disk 25 formed with a central opening in abutment against an inner shoulder of ring 20. The opening of the annular disk is of sufficient diameter for a clearance to subsist between the disk 25 and section 14 of shaft 12.

Deformable partitions, shown as bellows 26 and 27, sealingly connect disk 25 to flanges 28 and 29 respectively formed on sections 14 and 15. The bellows 26 and 27 cooperate with the flanges 28 and 29 and the disk 25 to define a pressure chamber 30 in which there opens a pressure inlet passage 31 formed in section 14.

The bellows 26 and 27 have different radial dimensions. Consequently, the pressure which prevails in the chamber 30 exerts on the disk 25 a resultant pressure force, directed from left to right in the figure. Calibrated resilient return means are provided to balance this force.

In the embodiment shown in FIG. 1, the return means include a return spring 32 compressed between the disk 25 and a washer 33 whose position is adjustable by means of a calibrating nut 34. A stop 35 limits the amount of movement of the movable assembly 19 when there is no pressure in chamber 30.

The detector 10 is provided with means arranged to deliver an electrical signal in response to the axial movement of the mechanism 19. In the embodiment of FIG. 1, they comprise variable reluctance differential transformer. The transformer comprises a receiver winding 36 carried by housing 11 and located between two energizing windings 37. The magnetic circuit of the differential transformer comprises a ring 38 placed in the housing 11 and formed with a counterbore accomodating the windings 36 and 37 and the ferromagnetic body 20 of movable unit 19. A groove whose axial dimention corresponds to that of the counterbore is formed in the body 20.

The division of the shaft into two sections makes it easier to make and assemble the detector. Adjustment at the factory is rendered easier by the calibrating unit 34. The air gap of the magnetic circuit of the transformer may be reduced to a very small value, and results in a high sensitivity and satisfactory precision, even for a slight extent of movement of unit 19, typically some millimeters.

The operation of the detector may easily be understood from the description of the construction: any movement of body 20 from the centered or neutral position in which it is shown in FIG. 1 changes the reluctance and induces a signal in the receiving winding 36 related to the amount of movement if the energizing windings 37 are energized. The windings can be energized and the signal may be picked up by an electrical cable provided with a suitable conventional aeronautical connector 39.

Figure 2:
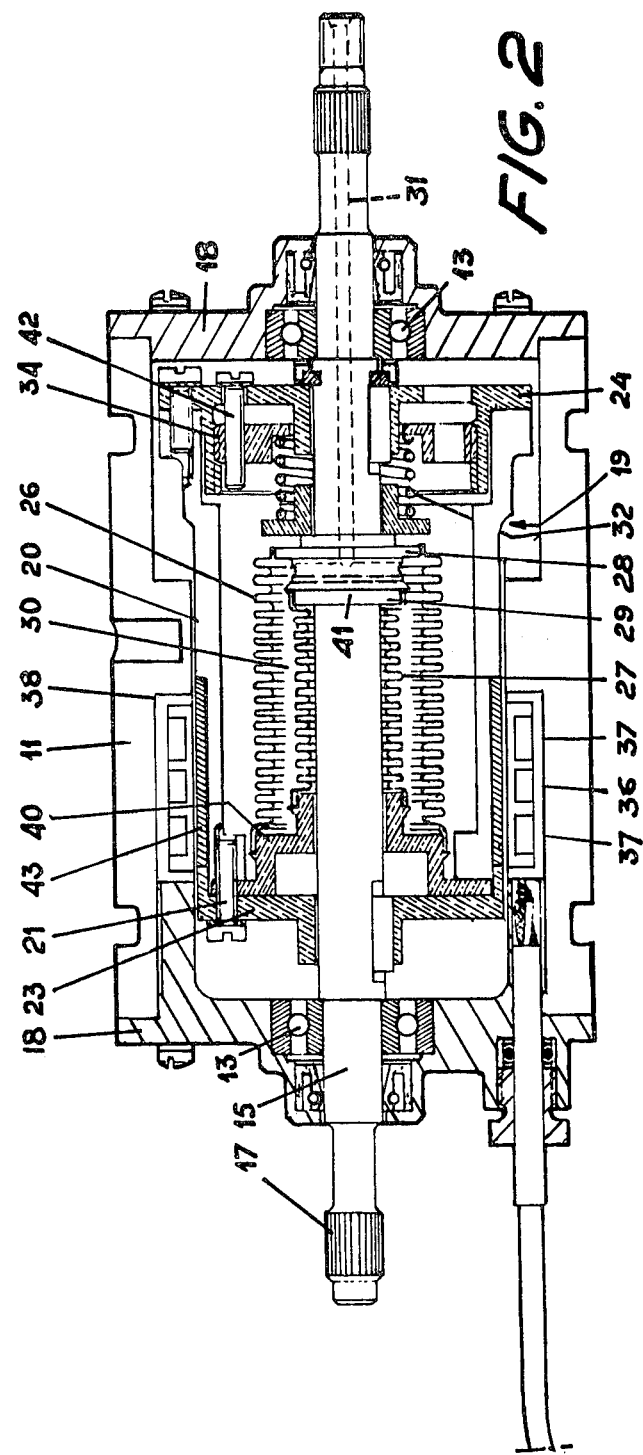

In the modified embodiment shown in FIG. 2, where the same reference characters are used for designating the components corresponding to those of FIG. 1, the rotatable shaft 12 is in one part only. For enabling assembly, the bellows 26 are located around bellows 27. Both bellows are each connected between a terminal disk 40 and a bulged portion 41 of the shaft which constitutes flanges 28 and 29. The passage 31 opens into chamber 30 between flanges 28 and 29.

The detector of FIG. 2 has means for adjustment of the pressure corresponding to a zero electric output. The adjustment means comprise a nut 34 whose position may be adjusted in plate 24 and which forms a bearing for return spring 32. After the nut has been adjusted, it may be locked with a screw 42. Variation of the reluctance upon movement of the movable unit is obtained by including a ring 43 of high permeability material (such as "ARMCO") in the unit.

The invention is obviously not limited to the particular embodiment which has been shown and described by way of example and it must be understood that the scope of the present patent extends to all modifications remaining within the scope of the appended claims.

We claim:

1. A fluid pressure detector comprising
a housing having an axis,
transmission shaft means mounted for rotation about said axis and retained against axial movement, having an end portion projecting out of said housing for mechanical connection with a rotatable member in which the pressure is to be detected,
a unit slidably non-rotatably connected to said rotatable shaft,
deformable wall means coaxial to said shaft means and cooperating with a surface of said unit to define a pressure chamber, said surface being constructed for the pressure in said chamber to exert a resultant axial pressure force on said unit,
passage means in said shaft means opening into said projecting end portion and into said chamber,
resilient return means operatively connecting said unit and shaft and exerting an axial force on said unit,
a differential transformer carried by said housing and having excitating and receiving coil means,
and a ferromagnetic body carried by said unit arranged to provide a coupling effect between said coil means which varies in dependence on the axial location of said unit along said shaft.

2. Detector according to claim 1, wherein said shaft means has two radially directed flanges of different diameters and said deformable wall means comprise a pair of bellows each connecting one of said flanges to a disk-shaped part fast with said unit, whereby two different pressure action areas are formed on end surfaces of said disk shaped part.

3. Detector according to claim 1, wherein said ferromagnetic body comprises a ring located for movement along said axis with respect to a ring of ferromagnetic material carried by said housing, said rings being separated by a radial clearance.

4. Detector according to claim 1, wherein said return means comprise a return spring in abutting relation with said unit and with means carried by said shaft means in an adjustable position.

5. A pressure detector according to claim 1 or 2, for measuring the gas pressure in an aircraft wheel tire, wherein said housing is securely connected to a wheel axle and one of the end portions of said shaft means projects out of said housing for connection with the rotatable part of said wheel.

6. A pressure detector according to claim 1 or 2, for measuring the gas pressure in an aircraft wheel tire, wherein said housing is securely connected to a wheel axle, and one of the end portions of said shaft means projects out of said housing for connection with the rotatable part of said wheel.

7. A fluid pressure detector for delivering an electric signal representative of the gas pressure in a rotatable wheel comprising a stationary housing; a transmission shaft mounted in said housing for rotation about an axis and against axial movement along said axis, having an end portion projecting out of said housing for mechanical connection with a rotatable wheel in which the pressure is to be detected; a unit slidably non-rotatably connected to said rotatable shaft; deformable wall means coaxial to said shaft and cooperating with a surface of said unit to define a pressure chamber, said surface being constructed for the pressure in said chamber to exert a resultant axial pressure force on said unit against the action of resilient return means; passage means in said shaft opening into said projecting end portion and into said chamber; and electrical detector means carried by said housing and and cooperating with means carried by said unit to provide an electric signal which varies in dependence on the axial location of said unit along said shaft.

* * * * *